June 4, 1963

G. L. DESROSIERS 3,091,950

PRELOAD RELEASABLE CLUTCH

Filed Nov. 10, 1961

INVENTOR.
GEORGE L. DESROSIERS
BY
Christie, Parker & Hale
ATTORNEYS.

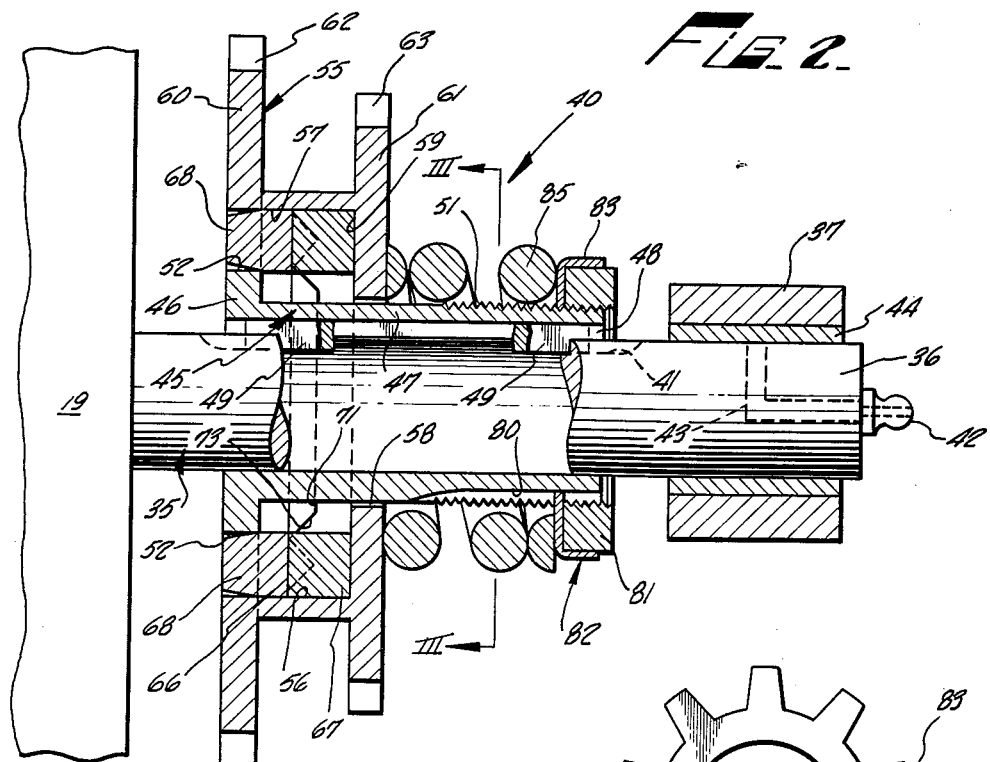

United States Patent Office 3,091,950
Patented June 4, 1963

3,091,950
PRELOAD RELEASABLE CLUTCH
George L. Desrosiers, Bakersfield, Calif., assignor to Painter Manufacturing Company, Bakersfield, Calif., a corporation of California
Filed Nov. 10, 1961, Ser. No. 151,476
4 Claims. (Cl. 64—29)

This invention relates to clutches. More particularly, it relates to clutches disposed between concentrically mounted driven and drive members releasable when a load on the driven member reaches a predetermined amount.

In the past various clutch systems have been proposed having the characteristic providing disengagement under a predetermined load. Conventionally, such devices have been installed between the adjacent ends of two coaxially mounted shafts. In many installations, the space requirements of such clutches resulted in a larger apparatus than otherwise would have been necessary.

The apparatus of this invention allows the rotatable drive member and driven member to be mounted concentrically and therefore results in a compact clutch assembly. The clutch members, disengageable when a predetermined load is impressed upon the driven member, are mounted between these concentric drive and driven members. It is not necessarily required, however, that the driven member be mounted concentrically with the drive member, even though a preferred embodiment of the invention teaches this feature. The driven member may have its axis of rotation spaced from the axis of rotation of the drive member with an intermediate member positively mechanically linked to the driven member engaged with the drive member.

In a particular embodiment of the invention which is described and discussed in detail below, the clutch is mounted between a drive shaft and a sprocket housing which is mounted concentrically with the drive shaft. The sprocket housing is adapted to drive a link chain which, in turn, serves to transfer rotary motion of the sprocket housing to the driven member. The utilization of the link chain provides positive mechanical connection between the housing and the driven member. Clutch members installed between the housing and the drive shaft, disengageable from each other when a predetermined load is registered on the driven member, eliminate chain and sprocket tooth breakage. Additionally, the clutch system provided by this invention, as distinguished from clutchs known heretofore, can be conveniently regulated to a preselected release force. In view of this preselection of release force, the clutch is automatic in operation and need not be attended by the operator of the apparatus in which the clutch is utilized.

Generally speaking, this invention provides an overload clutch apparatus installable between a rotatable drive member and a loadable rotatable driven member. The clutch provides for disengagement of the driven member from positive mechanical connection with the drive member when a predetermined load is imposed on the driven member. The apparatus of the overload clutch comprises a housing engageable in positive mechanical connection to one of the rotatable members. Flanged means are provided engageable in positive mechanical connection to the other rotatable member. Means for biasing the housing relative to the flanged means are provided. The invention further includes clutch means normally engageable under urging from the biasing means between the housing and the flanged means. These clutch means are secured from angular displacement relative to the housing and to the flanged means and are normally effective to transfer rotary motion of the drive member to the driven member. The clutch means are disengageable from transfer of such rotary motion against the biasing means when the load on the driven member exceeds an amount greater than that corresponding to the force of the biasing means. Additionally, the apparatus of the overload clutch may include means for preselecting the biasing force of the baising means such that when the load on the driven member corresponds to a preselected force of the biasing means, the clutch means disengage from transfer of rotary motion.

The following detailed description and explanation of the apparatus in conjunction with an exemplary environment will be facilitated through reference to the accompanying drawings, wherein:

FIGURE 2 is an enlarged cross-sectional elevation of the clutch as taken along line II—II of FIGURE 1;

FIGURE 4 is a further enlarged elevational view of one of the clutch members;

FIGURE 5 is an enlarged side elevation of one of the clutch members;

FIGURE 6 is a developed fragmentary side view of a clutch member as taken along line VI—VI of FIGURE 4; and FIGURE 7 is a plan view of the lockwasher.

Figure 1:
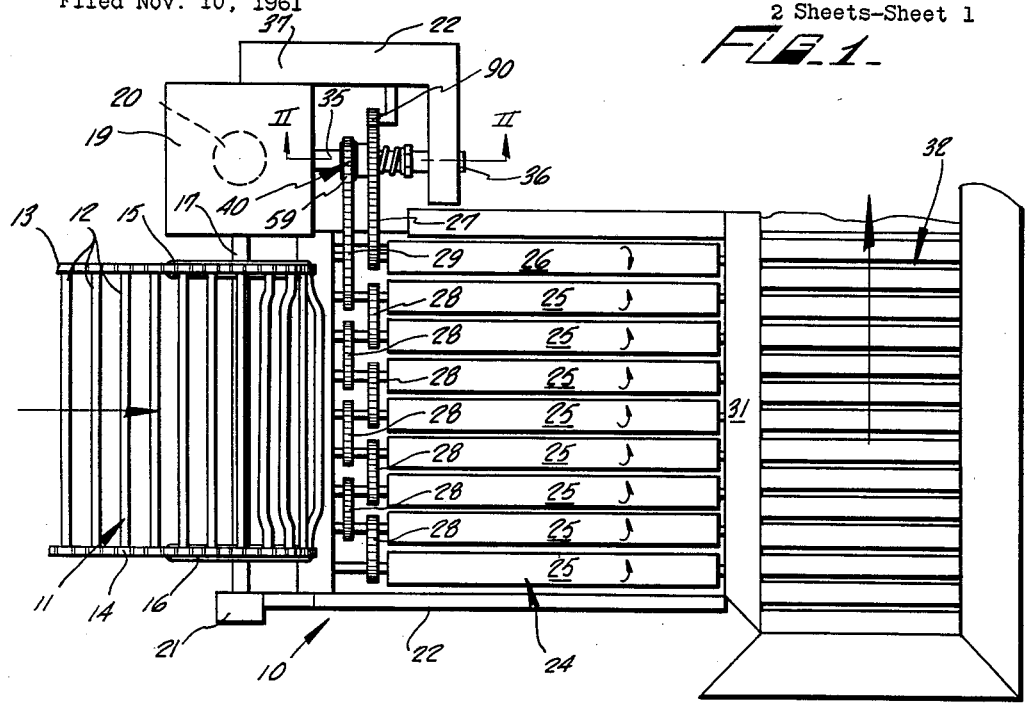
FIGURE 1 is a partial plan view of a portion of a potato harvester utilizing the clutch of this invention.

Referring to FIGURE 1, a portion of a potato harvesting machine 10 is illustrated. An elevator conveyor 11 comprised of variously configured transverse rods 12 mounted between a pair of chains 13 and 14 is inclined upwardly into engagement with a pair of spaced-apart sprockets 15 and 16 mounted to an output shaft 17. The shaft 17 extends from a gearbox 19 which is driven by an input shaft 20. The shaft 17 has its end remote from the gearbox 19 mounted in a journal bearing block 21 rigidly mounted to the frame 22 of the potato harvester 10.

The elevator 11 deposits potatoes which have been harvested onto a trash and clod removal table or platform 24 comprised of a plurality of rollers 25 rotating in the same direction and a single roller 26 rotating counter to the rotation of the rollers 25. The rollers 25 and 26 each have one of their ends journalled in the frame 22 of the harvester 10. The other ends of the roller 25 and 26 are engaged by a series of chain drive loops 27 and 28, but it is within the scope of this invention that chain loops 27 and 28 may be replaced by gears since the harvester 10 is largely an exemplary environment. The rollers 25 are engaged with the chain loops 28 in such a manner that all except the end one of the rollers 25 remote from roller 26 have engagement with two of the loops 28. The roller 25 adjacent to roller 26 is engaged with one of the loops 28 and with a chain loop 29. Chain loop 27 is engaged on a sprocket fixed coaxially with roller 26. After the potatoes are deposited on the trash and clod removal platform 24, the potatoes are caused to roll over a guide 31 onto a transverse horizontal conveyor 32 for carriage to a depository which, in most instances, is a truck moving through the potato field parallel to the harvester 10.

A second output shaft 35 extends from the gearbox 19. An internal preload-release clutch assembly 40 according to this invention is mounted on shaft 35 and is engaged with the chain loops 27 and 29 driving the rollers 26 and 25, respectively. The shaft 35 has its end 36 remote from the gearbox 19 journalled in a yoke 37 comprising a portion of the harvester frame 22.

Figure 3:
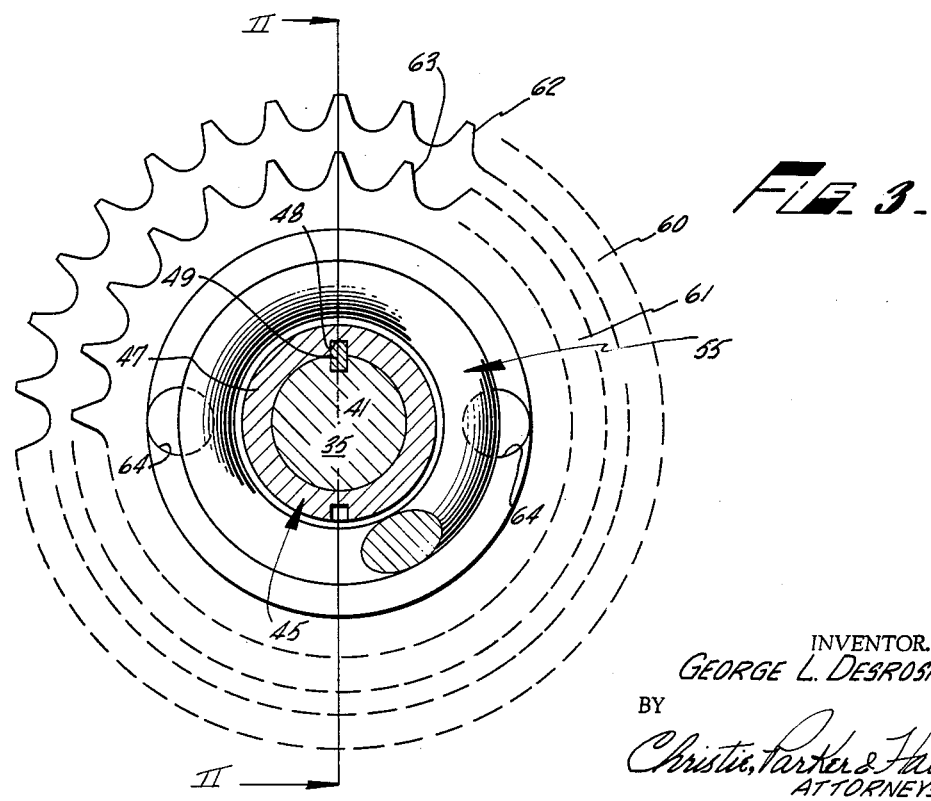
FIGURE 3 is an enlarged cross-sectional view of the clutch mechanism as taken along line III—III of FIGURE 2.

Referring to FIGURE 2, the clutch assembly 40 is illustrated in enlarged cross-sectional detail. The shaft 35 extending horizontally from gearbox 19 has a longitudinal keyway 41 formed therealong (see also FIGURE 3). At the end 36 of the shaft 35 a lubricating fitting 42 is provided in conjunction with a lubricating duct 43 extending axially inwardly and then radially to the circumferential surface of the shaft 35. The yoke 37 has a journal bearing 44 provided therein circumferentially engaging the end 36 of the shaft 35 to support the shaft 35 for rotary motion.

A spindle 45 having a radially circularly flanged end portion 46 and a cylindrical body 47 is engaged concentrically with the shaft 35. The longitudinal tubular body 47 of the spindle or flanged means 45 has a longitudinal keyway 48 milled internally therealong. A key 49 is engaged between the spindle keyway 48 and the shaft keyway 41 to secure the spindle in positive mechanical connection to the shaft 35 so that rotary motion of the shaft 35 is transferred directly to the spindle 45. The external surface of the spindle body 47 remote from the flanged end 46 is threaded, as at 51. A pair of apertures 52 extend through the flanged portion 46 longitudinally of the spindle 46 in a radially opposed disposition. The spindle 45 is shown mounted to the drive member or shaft 35, but the functions of the spindle can be associated more closely with the driven member than with the drive member.

A housing or sprocket member 55 is concentrically mounted on the spindle 45. The housing 55 has a central axial bore 56 longitudinally through its extent. The bore 56 has a first enlarged diameter portion 57 and a reduced diameter portion 58 defining a shoulder 59. The dimension of the reduced diameter portion 58 provides an aperture slightly larger than the external diameter of the spindle body portion 47. The diametrical dimension of the bore portion 57 is slightly larger than the maximum diameter of the flange portion 46 of spindle 45. A pair of radial sprockets 60 and 61 are provided on the external portion of the housing 55. The sprocket 60 is illustrated in FIGURE 2 at the end of the housing 55 adjacent the opening of the enlarged diameter portion 57 of the bore 56 and is of greater diameter than the sprocket 61 coplanar with the portion of the housing 55 defining the reduced diameter portion 58. Each of the sprocket wheels 60 and 61 has a peripheral surface consisting of a plurality of teeth 62 and 63, respectively. A pair of apertures 64 are drilled through the shoulder 59 of the housing 55 in radially opposed locations. The diameter of the aperture 64 corresponds to the diameters of the apertures 52 in the flanged spindle 45 and have the same radial spacing relative to the axis of the shaft 35 as do the apertures 52 of the spindle 45. The sprocket member 55 is shown as the driven member of the clutch assembly 40, but the functional aspects of the housing 55 might be more closely associated with the drive member.

A pair of identical clutch members 65, one of which is illustrated in FIGURES 4 and 5, are engaged between the spindle 45 and the housing 55 interiorly of the bore 56. For the sake of convenience in description, even though the clutch members 65 are identical, they shall be referred to frequently hereafter as the drive member clutch element 66 (the clutch element engaged with spindle 45) and the driven member clutch element 67 (the clutch element associated with spindle housing 55).

Each of the clutch members 65 is in the form of a planar ring. A pair of pins or lugs 68 spaced diametrically from one another project from the rear planar surface 69 of the ring 65. The maximum diameter of the lugs 68 is slightly less than the diameter of the apertures 52 and 64. The external diameter of the ring 65 is less than the diameter of the bore 56 of housing 55 while the inner diameter is greater than the external diameter of the spindle body 47.

In the form of the clutch means 65 illustrated in FIGURES 4 and 5, four raised lugs or projections 70 are raised from the forward front surface 71 of the ring 65 but any suitable number of convolutions may be used. The lugs 70 are spaced at ninety degrees (90°) from one another around the front surface 71. As illustrated more particularly in FIGURE 6, each of the projections 70 has an isosceles triangular convoluted profile. A pair of raised portions or lands 72 are formed diametrically opposed from one another on the forward surface 71 of the ring between the projections 70. The upper surface 73 of each land is coplanar with the upper limits of the triangular lugs 70. A radial groove 75 is provided between each of the adjacent lugs 70. The groove 75 has an isosceles triangular configuration identical to the convoluted configuration of the lugs 70. In view of the configuration of the clutch ring 65, when the drive member clutch element 66 and the driven member clutch element 67 are placed in juxtaposition to one another, each of the triangular lugs 70 of one member is engageable within the radial groove 75 of the other such that each ring makes frontal surface contact with the overall frontal surface of the other ring. It is within the scope of this invention, however, that the convoluted profiles of the clutch rings 65 may be cast or otherwise fabricated integral with the spindle 45 and the housing 55.

As illustrated particularly in FIGURE 2, the drive member clutch element 66 is engaged with the spindle 45 by engaging the lugs 68 within the apertures 52. The driven member clutch ring 67 has its lugs 68 engaged within the apertures 64 of the sprocket housing 55.

A keyway or external longitudinal groove 80 is milled in the threaded end of the body portion 47 of spindle 45. A hex nut 81 is engageable on the threaded external surface of the spindle body 47. A lock washer 82, illustrated particularly in FIGURE 7, is engageable with the nut 81 and the keyway or slot 80. The lock washer 82 is preferably fabricated from sheet metal and is configured as a ring having a plurality of radial lugs 83 extending outwardly from the ring and with a single radial lug 84 extending inwardly of the ring. The width of lug 84 corresponds to the width of the keyway 80.

A compression spring 85 having squared ends is provided for biasing the sprocket housing 55 toward the flanged portion 46 of the spindle 45. The inner diameter of the spring 85 is larger than the external diameter of the spindle body 47.

Once the clutch elements 66 and 67 have been inserted into their respective supporting members 45 and 55, respectively, the sprocket housing 55 is engaged over the body portion 47 of the spindle 45. The spring 85 is engaged over the protruding body portion 47 of the spindle 45. The lock washer 82 is positioned on the spindle 45 by engaging the lug 84 within the slot 80 and then the nut 81 is engaged with the threaded portion 51 of the spindle 45. The sprocket housing 55 is rotated on the spindle 45 until the convoluted surfaces of the clutch elements 66 and 67 mate. The nut 81 then is threaded toward the sprocket housing 55 until a predetermined amount of force is exerted by the spring 85. When this predetermined force has been attained in spring 85, the external radial lugs 83 of the lock washer 82 are bent over the hex nut 81, as illustrated in FIGURE 2, to secure the nut 81 from rotation relative to the spindle 45.

As illustrated in FIGURE 1, the chain loop 29 is engaged directly with the sprocket wheel 60. The chain loop 27 connected to counter-rotating roller 26 is engaged with an idler sprocket 90 and then against but not around sprocket wheel 61. In the particular enviroment illustrated in FIGURE 1, the features of the clutch assembly 40 are particularly advantageous. If a stone is deposited on the trash and clod disposal tray 24, the uniform rotation of the rollers 25 will transport the stone to the area between the rollers 25 and 26. If the stone is not overly large it will pass through the clearance between the rollers 25 and 26. If, however, the stone is of too large a dimension to pass between the rollers 25 and 26, the utilization of a platform 24 without the clutch assembly 40 provided by this invention could result in damage to the roller 25 or 26, or to chains 27 and 29, or to the gearbox 19 itself. Too large a stone engaged between the rollers 25 and 26 could cause the rollers 25 and 26 to bind or lock. Continued input of energy to the rollers through gearbox 19 and the drive chains could cause the chains 27 or 29 to break. Another form of damage to the apparatus would be in the breakage of a tooth from the sprockets 60 or 61 driving the chains 27 or 29.

With the utilization of the clutch assembly 40, however, the occasion of too large a stone between rollers 26 and 25 will not lead to destruction of any of the elements of the potato harvester 10. The load required to destroy the weakest portion of the roller drive mechanism can be predetermined from the structural characteristics of these elements. The clutch assembly 40 can be adjusted, and preferably is so adjusted, that the clutch elements 66 and 67 disengage when this predetermined load is registered between the rollers 25 and 26. If it it is assumed that the potato harvester 10 is in operation and such a load equalling or exceeding this predetermined load is manifested at the rollers 25 and 26, this load will tend to stop the rotation of these rollers. The tendency to stop the rotation of the rollers 25 and 26 will be manifested in the spindle housing 55 since the spindle housing 55 has a positive mechanical connection to the rollers through the drive chains 27 and 29. The manifestation of the predetermined load at the sprocket housing 55 will cause the clutch element 67 to drag relative to the clutch ring 66, but, due to the positive mechanical connection between the clutch ring 66 and the shaft 35, the predetermined force will cause the projections 70 of the driven member clutch element 67 to ride out or disengage from the radial grooves 75 of the drive member clutch element 66. When such disengagement occurs, the housing 55 displaces axially of the spindle 45 against the bias of the spring 85. The normal transfer of rotational motion from shaft 35 to the sprocket housing 55 is thus interrupted and no damage is produced since the tendency for the chains 27 or 29 to break is eliminated. A chattering noise will be heard as the driven member clutch ring 67 rotates relative to the drive member clutch ring 66 so that the operator of the harvester 10 is notified that an impediment exists in the carriage platform 24. He may then disengage the gearbox 19 from its power source and remove the impediment from between the rollers 26 and 25. An impediment present between any of the rollers 25 will also provide disengagement of the clutch members 66 and 67 since such an impediment would be manifested ultimately at the sprocket housing 55.

The force which is normally exerted between the clutch elements 66 and 67 is preselectable from a range of forces by adjustment of the spacing between the sprocket housing 55 and the nut 81. A particular criterion required with the spring 85 is that there be enough total clearance between the coils of spring 85 to accommodate disengagement of the clutch elements 66 and 67.

In the particular enviroment illustrated in FIGURE 1, the axial motion of the sprocket housing 55 relative to the shaft 35 is not particularly critical since the chains 27 and 29 are utilized. This axial movement of sprocket housing 55 is a result of the axial disengagement of the clutch rings 66 and 67 when the predetermined load is manifested in the clutch assembly 40. If gears were utilized between the shaft 35 and the member driven thereby, such a limited axial movement of the gears could be accommodated by providing gears of proper tooth width.

The clutch assembly 40 may be used in any installation where a rotatable drive member and a rotatable driven member are utilized.

While the invention has been described above in conjunction with specific apparatus, this has been by way of example and should not be considered as a limitation to the scope of this invention.

I claim:

1. An overload clutch apparatus connected between a rotary drive shaft and a rotatable driven member and operatively connected to a rotary means laterally spaced from the drive shaft providing interruption of transfer of rotary motion to the driven member when the driven member is subjected to a predetermined load, the clutch apparatus comprising a flanged sleeve disposed concentric to the drive shaft, means for mounting the sleeve to the drive shaft to be secured from angular displacement relative thereto, a housing comprising the driven member and defining an axial bore, the housing being rotatably and slidably disposed concentric to the sleeve, the sleeve extending through the housing to an end spaced from the sleeve flange and the housing, a pair of annular mating convoluted clutch means disposed concentric to the sleeve within the housing bore, means for securing one of the clutch means from angular displacement relative to the sleeve flange, means for securing the other clutch means from angular displacement relative to the housing, a spring retainer means disposed peripherally of the end of the sleeve, a spring compressibly engaged between the housing and the spring retainer means for urging the housing axially of the sleeve toward the sleeve flange and for maintaining the clutch means in rotary motion transferring engagement, and torque transmitting means disposed peripherally of the housing operatively engageable with the rotary means laterally spaced from the drive shaft.

2. In a trash and clod disposal platform of a potato harvesting machine including at least two counter-rotating rollers spaced apart from and driven from a rotary drive shaft, the rollers and the drive shaft having axes which are substantially parallel, the improvement residing in an overload clutch apparatus comprising an elongated sleeve, mounting means mounting the sleeve to the shaft and securing the sleeve from angular displacement relative to the shaft, a radially outwardly extending flange circumferentially of one end of the sleeve and a threaded exterior circumference at the other end of the sleeve, a housing rotatably and slidably disposed concentric to the sleeve and defining an axial annular bore, the sleeve extending through the bore of the housing and the said other end of the sleeve being disposed exteriorly of the bore, the bore having an enlarged diameter portion, a pair of annular clutch members having mating convoluted surfaces positioned between the sleeve flange and the housing within the bore enlarged diameter portion, means for securing one clutch member from angular displacement relative to the flange, means for securing the other clutch member from angular displacement relative to the housing, a coil compression spring disposed concentric to the sleeve, a spring stop nut threadedly engaged with the threaded end of the sleeve, the spring being compressibly engaged between the housing and the stop nut to exert a preselected force on the housing to urge the clutch members into mating engagement, means disposed between the spring and the stop nut for locking the stop nut in a selected location relative to the sleeve, the other clutch member moving anguarly and axially of the sleeve with the housing against the preselected force of the spring to interrupt transfer of rotady motion from the shaft to the housing when a predetermined load is imposed on the rollers, and means circumferentially of the housing operatively engaged with the rollers to transfer rotary motion of the housing to the rollers.

3. An overload clutch appartaus for a trash and clod disposal platform according to claim 2 wherein the means disposed circumferentially of the housing operatively engaged with the rollers comprises a pair of chain sprockets formed integrally with the housing, the sprocket being spaced apart from one another along the axis of the drive shaft.

4. An overload clutch apparatus for a trash and clod disposal platform according to claim 2 wherein the means disposed between the spring and the stop nut comprises an annular planar lockwasher having a plurality of external radial lugs deformable from the plane of the lockwasher to engage the nut, and a radial lug in the plane of the washer extending inwardly of the washer, the threaded end of the sleeve defining an axial keyway slot in the exterior of the threaded end of the sleeve, the inwardly extending lug of the washer being engaged in the keyway slot.

References Cited in the file of this patent
UNITED STATES PATENTS

| | | |
|---|---|---|
| 681,476 | Flautt | Aug. 27, 1901 |
| 1,828,370 | Huddle | Oct. 20, 1931 |
| 1,911,507 | Hitchcock | May 30, 1933 |
| 2,333,553 | Potgieter et al. | Nov. 2, 1943 |
| 2,561,136 | Richardson | July 17, 1951 |
| 2,573,140 | Heth | Oct. 30, 1951 |